May 20, 1930.  A. P. ROMANIUK  1,759,280
LAND AND WATER VEHICLE
Filed Sept. 3, 1929   2 Sheets-Sheet 1
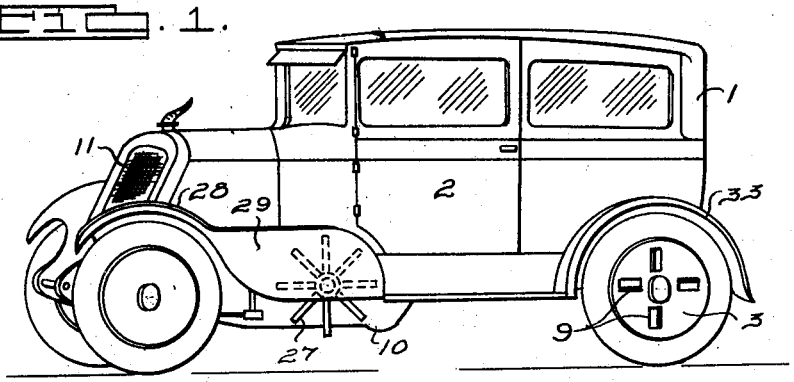
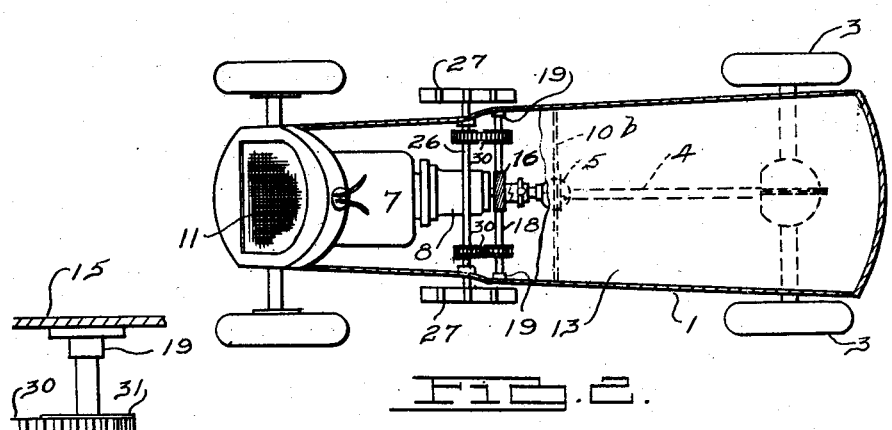
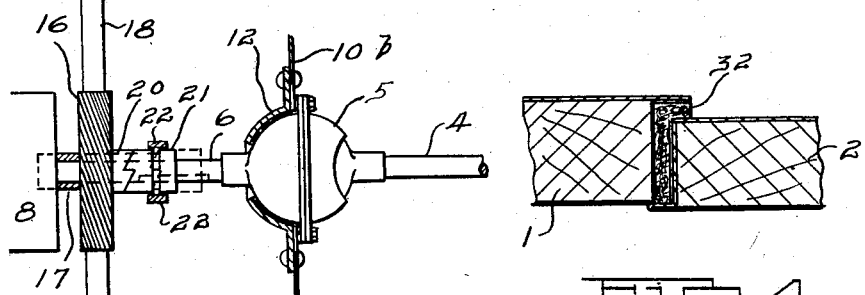
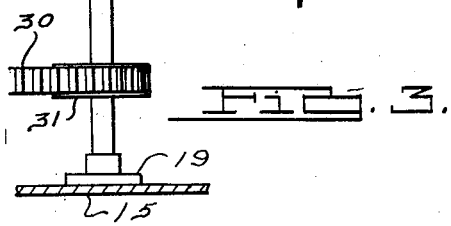
INVENTOR
Alexsey P. Romaniuk
BY
ATTORNEY May 20, 1930.  A. P. ROMANIUK  1,759,280
LAND AND WATER VEHICLE
Filed Sept. 3, 1929   2 Sheets-Sheet 2
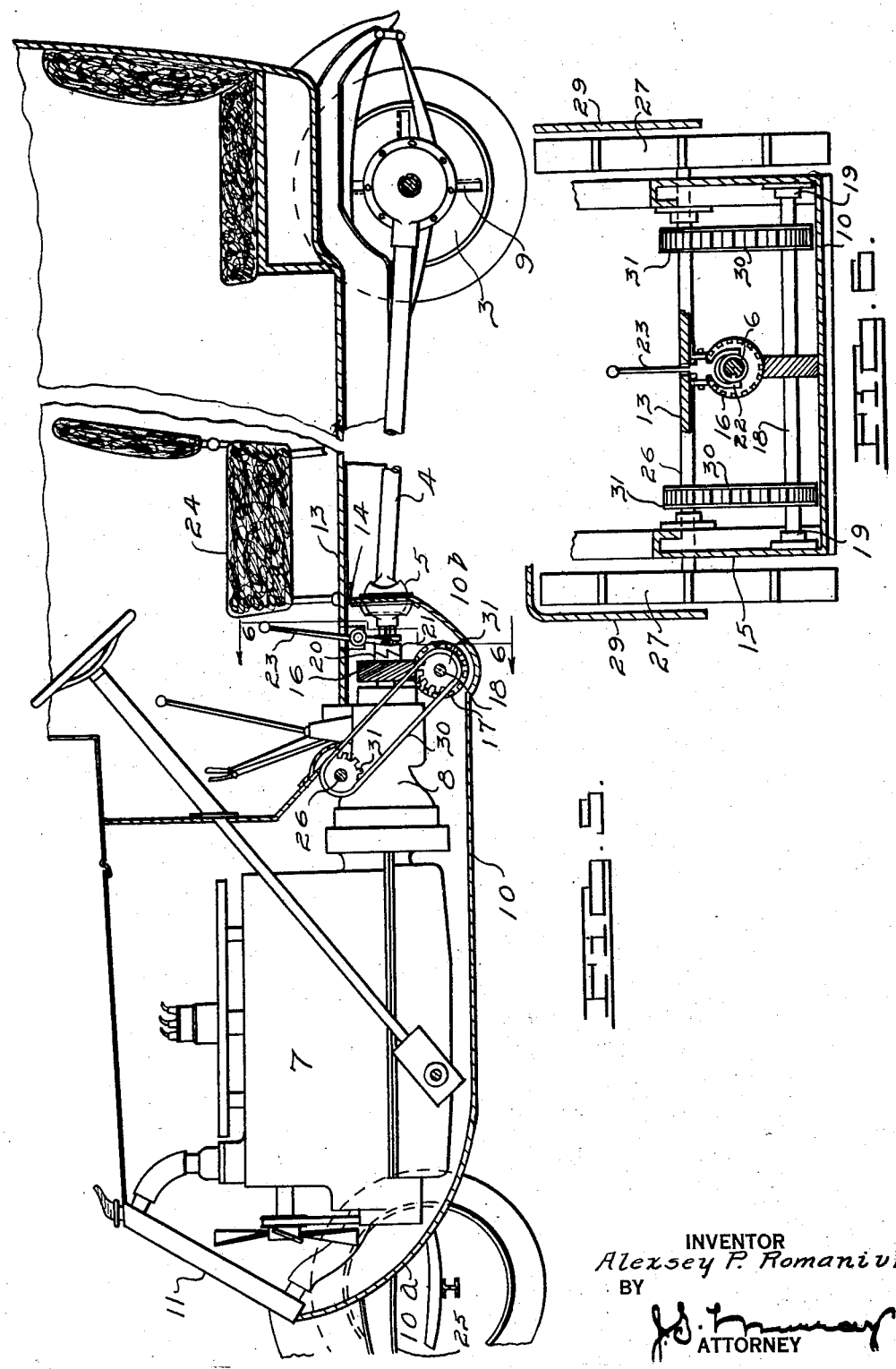
INVENTOR
*Alexsey P. Romaniuk.*
BY
ATTORNEY Patented May 20, 1930

1,759,280

UNITED STATES PATENT OFFICE

ALEXSEY PETTROW ROMANIUK, OF DETROIT, MICHIGAN

LAND AND WATER VEHICLE

Application filed September 3, 1929. Serial No. 390,136.

This invention relates to land and water vehicles.

An object of the invention is to adapt a vehicle to be driven either on land or water by the same motor and through the same speed-selecting gearing.

Another object is to arrange a shaft transversely of a wheeled motor vehicle and mount thereon paddle wheels affording propulsion in water, and to provide for making and breaking a drive connection to said shaft from the vehicle motor.

A further object is to extend a sheet metal guard below the motor and transmission of the vehicle and to adapt said guard to exclude water from said parts and add to the buoyancy of the vehicle on water.

Still another object is to so arrange the radiator of a motor vehicle as to prevent the entrance of water to the hood of the vehicle when the same is traveling on water.

These and various other objects the invention attains by the construction hereinafter described and illustrated in the accompanying drawings, wherein:

Fig. 1 is a perspective view of the herein disclosed land and water vehicle.

Fig. 2 is a horizontal sectional view of said vehicle.

Fig. 3 is a fragmentary enlargement of a portion of Fig. 2, showing primarily a gearing for driving the paddle wheels and a clutch controlling such drive.

Fig. 4 is a view showing water-sealing means around one of the door seats of the vehicle.

Fig. 5 is a longitudinal vertical sectional view of a vehicle.

Fig. 6 is a cross sectional view of same, taken upon the line 6—6 of Fig. 5.

In these views, the reference character 1 designates a closed vehicle body having one or more doors 2 and conforming substantially to standard practice. The rear wheels 3 of said body are driven as is customary through a propeller shaft 4 connected through a universal joint 5 with a shaft 6. The latter is driven, in the usual manner, from a motor 7 through a change-speed gearing (not shown) carried by a casing 8. The wheels of said vehicle, both front and rear, are preferably of a disk type, and the disk bodies of the rear wheels 3 are preferably formed with struck-out radial vanes 9 for a purpose hereinafter discussed.

Departing from ordinary practice, the present invention provides beneath the motor and transmission casing a sheet metal plate 10, the forward portion of which is upwardly curved at the front of the motor as indicated at 10′ and water-sealed to the radiator 11 at a level considerably above that of the bottom portion of said plate, thus preventing access of water to the space within the member 10 when the vehicle is traveling on water. Since the described construction shortens the radiator, as compared to standard practice, it is preferred to incline the radiator as best appears in Fig. 5, so that it may still have the necessary area, without undue height.

The member 10 has a rear wall $10^b$, rising diametrically of the universal joint 5 and carrying a water-sealing bearing 12, engaging said joint as best appears in Fig. 3. Said wall at its upper edge has a water-sealed connection with the floor 13 of the body 1, as indicated at 14. The member 10 has side walls 15 forming downward extensions from the body and hood of the vehicle and water-sealed to the latter.

Within the buoyant member 10 a spiral gear 16 loosely mounted on the shaft 6 meshes with a spiral gear 17 fast on a relatively transverse shaft 18 journaled within the member 10 below said shaft 6, blind bearings 19 being interiorly carried by the walls 15 to receive said shaft.

The drive through the gears 16 and 17 is controlled by clutch members 20 and 21, the former rigidly carried by the gear 16, and the latter splined on the shaft 6 to engage or disengage the former. The clutch member 21 is actuable by a yoke 22 controlled by a lever 23 projecting through the floor 13 in convenient proximity to the driver's seat 24. Transversely journaled upon the vehicle frame 25 within the buoyant member 10 is a shaft 26 extending preferably above the gear casing 8 and terminally carrying a pair of paddle wheels 27. The mud guards 28 of the front wheels have aprons 29 downwardly extending therefrom at the outer sides of the upper portions of said paddle wheels, as best appears in Fig. 1. The shaft 26 is adapted to be driven from the shaft 18 by one or more chains 30 engaging sprocket wheels 31 upon said shafts.

Fig. 4 shows packing material 32 in the nature of felt or rubber, which extends around the seats of the doors 2 to water-seal said seats, particularly when the vehicle is traveling on water.

In travel of the described vehicle on land, the clutch member 21 is maintained in released position (shown in dash lines in Fig. 3), the rear wheels 3 being driven through the propeller shaft 4 from the motor 7 through the transmission housed at 8, as is common practice. To adapt said vehicle for water use, it is necessary only to manipulate the lever 23 to engage the clutch members 20 and 21, and establish a drive to the paddle wheel shaft through the gears 16 and 17, shaft 18, and chains 30. When traveling on water, the drive to the rear wheels is not cut off, the vanes 9 on said wheels materially assisting in propelling the vehicle. The guards 33 peripherally adjacent to the upper portions of said wheels render the vanes 9 ineffective when traveling forwardly in the upper portion of their orbits.

The body 2, in conjunction with the buoyant member 10, together form an air-confining space to maintain the vehicle afloat on water.

The essential features above disclosed may be embodied in various models and sizes of vehicles, and particularly those intended for army use or for travel in regions not adequately provided with bridges.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. A land and water vehicle comprising ground wheels, a motor, a drive connection to said motor from said wheels including a universal joint and a buoyant member extending beneath the motor and having side walls at opposite sides of the motor and a front wall forward of the motor, and having a rear wall, and means water-sealing said universal joint in said rear wall.

2. A land and water vehicle comprising ground wheels, a motor, a drive connection from said motor to said wheels, elements for propelling said vehicle in water, a drive connection from said motor to said elements, a clutch controlling the last mentioned drive connection, a radiator mounted at an abnormal height on said vehicle to dispose the same above the water level when the vehicle is traveling on water, and inclined rearwardly from bottom to top to give adequate cooling area without undue upward extent, and a buoyant member water-sealed to the lower end of said radiator forwardly of the motor.

3. A land and water vehicle comprising a motor and ground wheels and a drive connection from the former to the latter, including a universal joint, a buoyant member having a rear wall diametrical to said universal joint, means water-sealing said wall to the vehicle body, means water-sealing said wall to said universal joint, a shaft journaled transversely of the vehicle and extending through the air chamber of said buoyant member, a drive connection in said chamber from the motor to said shaft, a clutch controlling said drive connection, and a pair of paddle wheels carried by said shaft at each side of said buoyant member.

In testimony whereof I sign this specification.

ALEXSEY PETTROW ROMANIUK.